(12) United States Patent
Chang et al.

(10) Patent No.: US 7,706,299 B2
(45) Date of Patent: Apr. 27, 2010

(54) UPSTREAM BANDWIDTH ESTIMATION

(75) Inventors: Ray Chang, Irvine, CA (US); Luan Dang, Newport Beach, CA (US)

(73) Assignee: Cisco Technology, Inc., San Jose, CA (US)

( * ) Notice: Subject to any disclaimer, the term of this patent is extended or adjusted under 35 U.S.C. 154(b) by 1565 days.

(21) Appl. No.: 10/965,593

(22) Filed: Oct. 13, 2004

(65) Prior Publication Data

US 2006/0077960 A1 Apr. 13, 2006

(51) Int. Cl.
*H04J 1/16* (2006.01)

(52) U.S. Cl. ............. 370/253; 370/230.1; 370/231; 370/232; 370/233; 370/234; 370/235; 370/237; 370/252; 370/352; 370/395.52; 709/224; 709/225; 709/235

(58) Field of Classification Search ......... 370/351–357, 370/395.52, 230.1, 231–235, 237, 252, 253, 370/395.53; 709/224, 225, 235
See application file for complete search history.

(56) References Cited

U.S. PATENT DOCUMENTS

| | | | |
|---|---|---|---|
| 6,297,823 B1 * | 10/2001 | Bharali et al. ............... 715/788 |
| 6,529,475 B1 * | 3/2003 | Wan et al. .................... 370/231 |
| 6,680,930 B2 | 1/2004 | Newberg et al. |
| 6,681,232 B1 * | 1/2004 | Sistanizadeh et al. ..... 707/104.1 |
| 6,996,626 B1 * | 2/2006 | Smith .......................... 709/232 |
| 7,007,296 B2 * | 2/2006 | Rakib .......................... 725/111 |
| 7,120,139 B1 * | 10/2006 | Kung et al. .................. 370/352 |
| 2005/0201414 A1 | 9/2005 | Awais .......................... 370/468 |
| 2006/0221854 A1 * | 10/2006 | Price et al. ................... 370/253 |
| 2008/0031229 A1 * | 2/2008 | Michelson et al. .......... 370/352 |
| 2008/0101378 A1 * | 5/2008 | Krueger ................. 370/395.52 |

* cited by examiner

*Primary Examiner*—Hemant Patel
(74) *Attorney, Agent, or Firm*—Haynes & Boone, LLP.

(57) ABSTRACT

A technique for estimating the upstream bandwidth for a modem is provided. Various-sized packets are sent on roundtrip journeys through the modem. The roundtrip times for the various-sized packets are compared to provide an estimate of the modem's upstream bandwidth. Alternatively, a block file may be transmitted through the modem to a TFTP server. The TFTP server reports the time needed to complete the file transfer. Based upon the block file transmission start time and the completion time, an upstream bandwidth estimate may be performed. Given the upstream bandwidth estimation, non-VoIP upstream data traffic may be limited accordingly to provide a desired QoS to VoIP calls being supported by the modem.

16 Claims, 7 Drawing Sheets

UPSTREAM BANDWIDTH ESTIMATION

TECHNICAL FIELD

This invention relates generally to networks, and more particularly to the estimation of the upstream bandwidth for users in a wireless network.

BACKGROUND

Voice over IP (VoIP) has the capability of substantially lowering costs with respect to traditional telephone service. Rather than use conventional analog telephone lines, a user having a VoIP-enabled telephone connects with other callers through the digital lines supported by the Internet. Because the connection is digital, a VoIP-enabled phone offers features and services that a conventional telephone typically cannot, such as sending images or videos in conjunction with voice communication. Moreover, as is the case with conventional Web-browsing, VoIP calls have the potential for the same toll, regardless of the length of the conversation and the distance called.

Although VoIP telephony has great potential, it also faces considerable technical challenges. In a traditional telephony, a call is placed over a dedicated circuit. The traditional telephone network provides resources that guarantee the voice quality over this dedicated circuit set up to support the telephone call. In contrast, communication over the Internet is packet-based. Each packet has two parts: an information payload and meta-data such as the destination address. On the Internet, packets are forwarded by routers based upon the destination address. Each packet making up digital content could thus be sent from a source to a destination address over independent paths—there is no dedicated circuit as is the case for traditional telephony. The absence of a dedicated circuit does not impact traditional Web-browsing, however. A user wishing to download a webpage can wait until the various packets making up the webpage's content are routed through the Internet and then re-assembled to present the desired content.

But effective voice communication cannot occur with arbitrary delays on the digitized voice messages. Instead, effective voice communication can tolerate a maximum of approximately 100 milliseconds of delay between the time speech is uttered and the time it is heard by the listener. Greater delays hinder communication and violate the users' real-time expectations. But packets themselves hinder real-time communication. For example, suppose a VoIP protocol uses 500-byte packets. Assuming that voice is digitized at 8000 one-byte samples per second, each 500-byte packet would take 62.5 milliseconds to fill. Over 60% of the entire acceptable delay is thus taken up by just filling the packet, which hasn't yet touched the Internet. To combat this problem, specialized voice compression and VoIP protocols have been developed such as H.323.

As the use of VoIP telephony expands into the home market, it must combat the restricted bandwidths typically available to a home-based Internet user. For example, consider the two most-commonly-used high-speed Internet access methods available for the home user: Digital Subscriber Line (DSL) and cable modem services. For both services, the available bandwidth is typically asymmetrically proportioned such that a user has more downstream bandwidth than upstream bandwidth. This asymmetric division satisfies a typical Web-browser's needs in that content generally flows downstream from webpages to a user's web-browser rather than in the upstream direction. Depending upon the subscription purchased, a DSL provider will offer varying bandwidth packages to its users. For example, a DSL provider may offer a standard package providing a down-stream bandwidth of 512 kbps and an upstream bandwidth of 128 kbps. Note that as used herein, "bandwidth" is expressed as an achievable data rate rather than in Hz. In other words, to say the bandwidth of the upstream channel is 128 kbps is to say that the up-stream bandwidth is such that it will support a data rate of 128 kbps. In contrast to the conventional package just described, "premium" packages would offer greater downstream and upstream bandwidths, albeit in analogous asymmetric proportions. The up-stream bandwidth for a cable modem service is more nebulous in that cable modem services do not offer the fixed bandwidths that DSL services can offer. Instead, the available bandwidth for a cable modem is shared with other users and will thus vary depending on cable traffic. However, cable modems typically proportion the available band-width for any given user in an asymmetric fashion between upstream and downstream uses. Thus, typical upstream cable modem bandwidths will also often be in the range of 128 kbps.

As discussed above, the acceptable delay for VoIP telephony is approximately 100 milliseconds. The limited upstream bandwidths typically provided by high-speed Internet access methods such as DSL and cable modems is a factor in this delay. If too little upstream bandwidth is available, the voice data rate is slowed such that the acceptable delay will be violated. For example, VoIP implemented with a G.711 codec requires at least 100 kbps in upstream bandwidth. But note that a VoIP caller may also be emailing others while speaking. In particular, recall that VoIP also supports the sending of digital content such as video in addition to the voice communication. Thus, a VoIP call may also compete for the limited upstream bandwidth with the presence of other digital content being transmitted upstream. In addition, the VoIP caller may be sharing a modem with other users on a LAN who happen to be uploading content. Depending upon the available upstream bandwidth, the data rate of content besides voice data may need to be limited to provide adequate VoIP telephony service.

Accordingly, there is a need in the art for improved VoIP systems that can estimate their available upstream bandwidth and adjust the upstream voice and non-voice data loads accordingly.

SUMMARY

In accordance with one aspect of the invention, a method of estimating the upstream bandwidth for a modem is provided. The method includes the acts of: transmitting from a first node various-sized packets through an upstream path for the modem to an second node, the second node being configured to re-transmit the various-sized packets through a downstream path for the modem to the first node such that each packet makes a roundtrip through the modem; determining the roundtrip times for the various-sized packets; and based upon a comparison of the roundtrip times, estimating the upstream bandwidth of the modem.

In accordance with another aspect of the invention, a VoIP-integrated router operable to interface with analog telephones and digital devices is provided. The VoIP-integrated router is configured to perform a method of estimating the upstream bandwidth of a modem, comprising: transmitting a block file from the VoIP-integrated router through an upstream path for the modem to a TFTP server, the TFTP server being configured to measure a completion time for the transmission of the block file, the VoIP-integrated router being configured to measure a start time for the transmission of the block file; determining a total transmission time for the transmission of the block file based upon the measured start time and the completion time; based upon a comparison of the total transmission time and a size of the block file, estimating the upstream bandwidth of the modem.

In accordance with another aspect of the invention, a VoIP telephone is provided. The VoIP telephone is configured to perform a method of estimating the upstream bandwidth of a modem, comprising: transmitting a block file from the VoIP telephone through an upstream path for the modem to a TFTP server, the TFTP server being configured to measure a completion time for the transmission of the block file, the VoIP telephone being configured to measure a start time for the transmission of the block file; determining a total transmission time for the transmission of the block file based upon the measured start time and the completion time; based upon a comparison of the total transmission time and a size of the block file, estimating the upstream bandwidth of the modem.

BRIEF DESCRIPTION OF THE DRAWINGS

Embodiments of the present invention and their advantages are best understood by referring to the detailed description that follows. It should be appreciated that like reference numerals are used to identify like elements illustrated in the figures.

DETAILED DESCRIPTION

Figure 1:
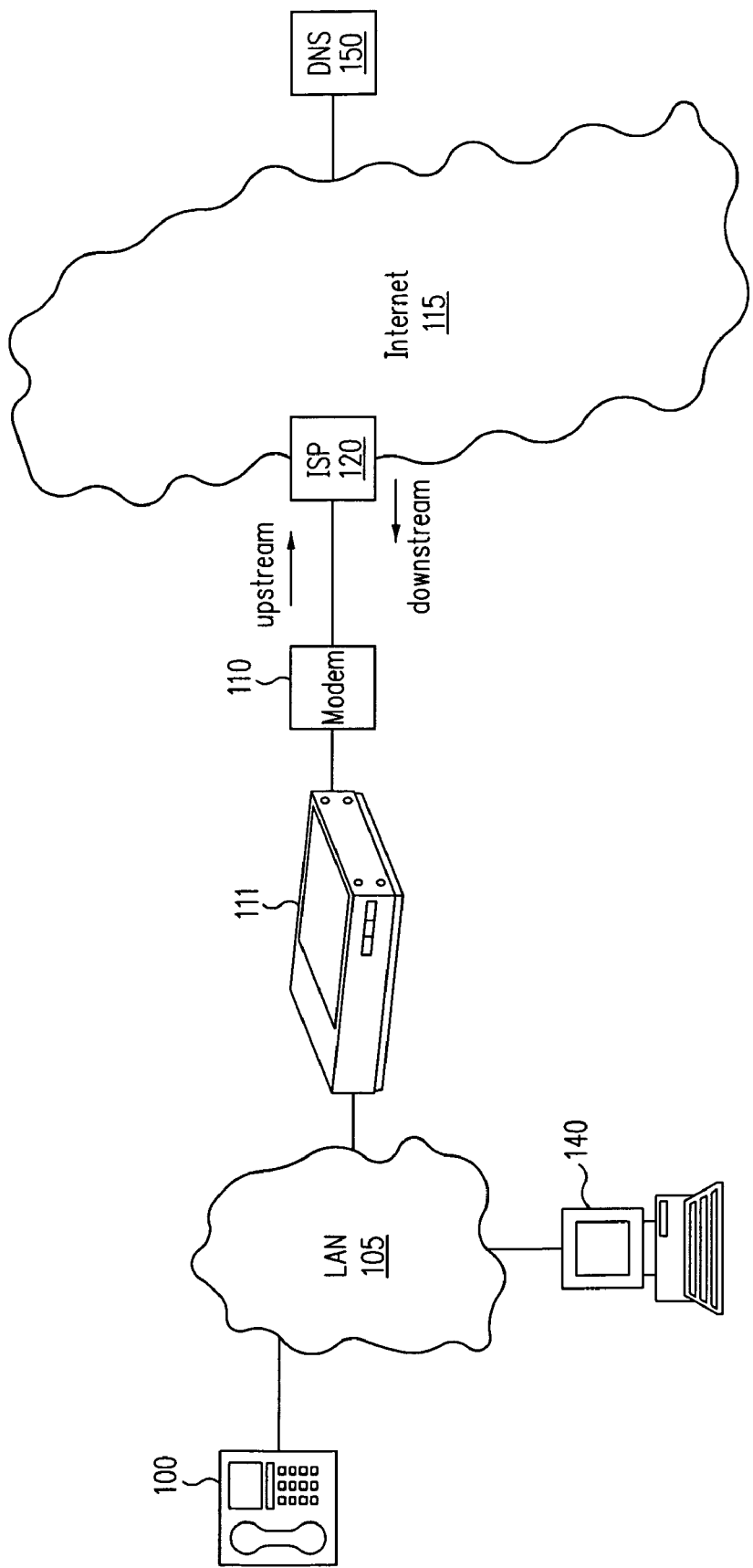
FIG. 1 is a block diagram illustrating a system including an VoIP-integrated router that estimates an upstream bandwidth of a modem in accordance with an embodiment of the invention.

Turning now to FIG. 1, an exemplary embodiment of the present invention is illustrated. A modem 110 allows users on a LAN 105 to access content on Internet 115 through communication with a VoIP Internet Service Provider (ISP) server 120. Modem 110 can be any suitable modem such as a DSL modem or a cable modem. As discussed previously, modem 110 has a limited upstream bandwidth within which it may provide digital content to ISP server 120. Typically, this limited upstream bandwidth would be less than the downstream bandwidth over which modem 110 may receive content from ISP server 120. However, it will be appreciated that the present invention may be used to estimate the upstream bandwidth for modem 110 regardless of the relationship between the upstream and downstream bandwidths.

An integrated router 111 provides the interface between users on LAN 105 and nodes on Internet 115. Router 111 is an integrated router in that it supports voice over IP (VoIP) calls as well. Thus, integrated router 111 includes an analog port such as an RJ11 port over which it may communicate with a conventional analog telephone 100. Integrated router 111 includes other ports such an Ethernet RJ45 port over which it communicates with devices on LAN 105 such as a processor 140. These devices on LAN 105 generate IP data packets that integrated router 111 transmits through modem 110 to upstream destinations on Internet 115. In addition, integrated router 111 transmits VoIP packets to upstream destinations on Internet 115 based upon the telephone number dialed on telephone 100. As discussed previously, to satisfy QoS expectations for voice communications, VoIP requires a certain upstream bandwidth capability for modem 110—for example, VoIP implemented with a G.711 codec requires at least 100 kbps in upstream bandwidth. To measure the upstream bandwidth for modem 110 so that data traffic may be limited accordingly, integrated router 111 transmits IP packets through modem 110 and the upstream bandwidth to a node on Internet 115 to perform the upstream bandwidth estimation.

To estimate the upstream bandwidth for modem 110, integrated router 111 transmits various-sized packets to a node on the Internet. The node is configured to return the packets back to processor 140. By comparing the roundtrip time (the period between the sending time and the receipt time) for these various-sized packets, integrated router 111 may estimate the upstream bandwidth utilized by modem 110. A particularly convenient format for integrated router 111 to utilize in sending the various-sized packets is the Internet Control Message Protocol (ICMP). As known in the art, ICMP includes a PING message, wherein one or more packets are transmitted and the roundtrip times measured. PING messages are typically employed as a type of lowest-common-denominator network diagnosis in that if a host responds to a PING message, it may be assumed that the host exists on the network.

In the present invention, the PING message is exploited to determine the upstream bandwidth by PINGing various-sized packets. For example, a 64-byte PING message and a 512-byte PING message may be sent from integrated router 111 to a node on the Internet. Because the upstream bandwidth will typically be the predominant factor in the roundtrip time for the PINGed packets, the difference between the roundtrip times for the PING messages of varied packet sizes may be used to provide an estimate of the upstream bandwidth.

This estimation would be based upon previous roundtrip delays calculated for known upstream bandwidths. For example, modem 110 may be configurable to provide upstream bandwidths accommodating data rates of 64 kbps, 128 kbps, 256 kbps, 512 kbps, and 800 kbps. While configured at each of these upstream bandwidths, various-sized PING messages are delivered to a node on the Internet. For example, PING messages having a packet size of 64 bytes, 256 bytes, 512 bytes, and 1024 bytes may be bounced from the Internet node and the roundtrip times compared. As would be expected, the roundtrip time differences between the various-sized packets becomes more pronounced as the upstream bandwidth is reduced. Conversely, as the upstream bandwidth is increased, the roundtrip time differences become less pronounced. From these time differences, integrated router 111 may be configured with an algorithm such that given the roundtrip time differences for a given set of various-sized packets, integrated router 111 may estimate the upstream bandwidth that would be expected to have caused such time differences. This rule can take the form of a mathematical expression or may involve a table lookup. Regardless of the form of the rule, integrated router 111 may then provide an estimate of the upstream bandwidth. Based upon this estimate, integrated router 111 may then limit the transmission of non-VoIP data packets accordingly so to the appropriate portion of the upstream bandwidth is reserved for VoIP data packets to ensure that the desired VoIP Quality of Service (QoS) is provided. For example, if the desired QoS requires 100 kbps in bandwidth and the estimated upstream bandwidth is 128 kbps, then non-VoIp data traffic would be limited by integrated router 111 to exceed no more than 28 kbps.

Note the advantages of such an upstream bandwidth estimation technique. A typical user of modem 110 will not be aware of the upstream bandwidth available for modem 110 nor will have the technical expertise to ascertain this upstream bandwidth from user manuals or the like. However, as discussed previously, a certain portion of the upstream bandwidth must be reserved for VoIP data traffic to satisfy the expected QoS for adequate telephone service. The user then has no intelligent way to modify or configure integrated router 111 to limit other upstream data traffic to provide the desired VoIP QoS because the limitation on the other upstream data traffic will depend upon the available upstream bandwidth. But an integrated router 111 configured to implement the bandwidth estimation techniques disclosed herein eliminates the need for a sophisticated user to ascertain the upstream bandwidth. Moreover, no matter how sophisticated a user may be, should modem 110 be a cable modem, the upstream bandwidth can only be ascertained in a dynamic fashion—a cable modem user cannot be guaranteed any fixed upstream bandwidth as may be the case for a DSL modem.

Figure 2:
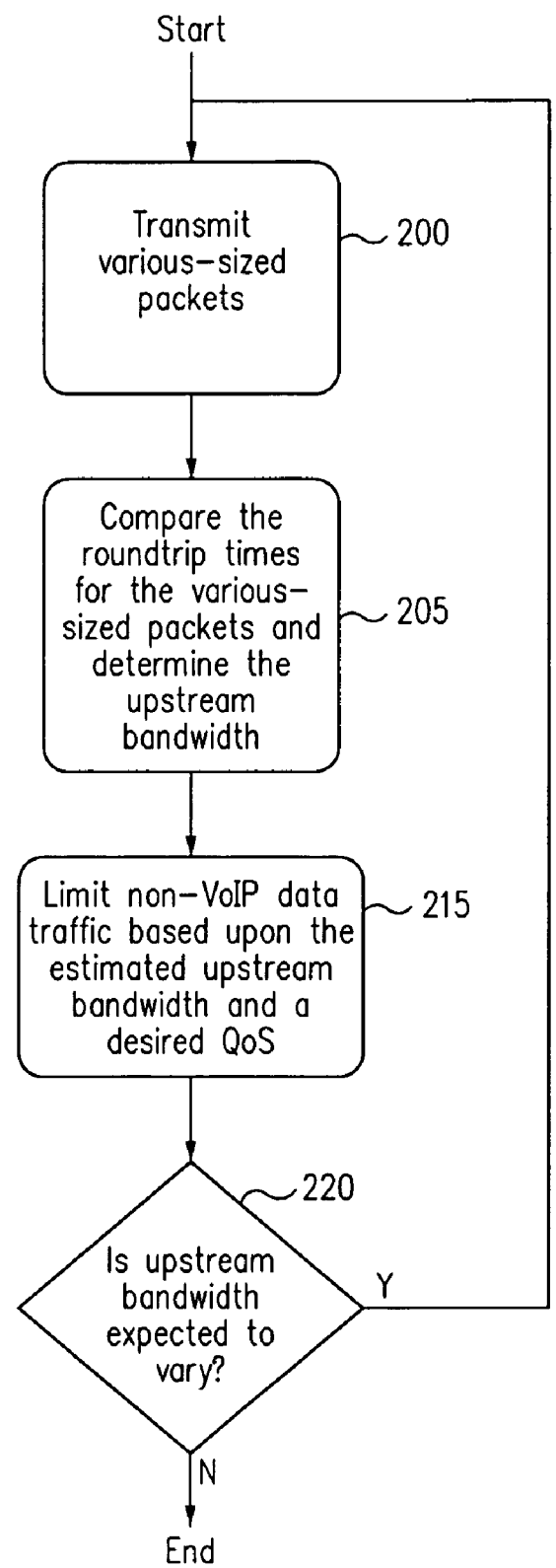
FIG. 2 is a flowchart illustrating a modem upstream bandwidth estimation method in accordance with an embodiment of the invention.

Turning now to FIG. 2, a flowchart summarizing the upstream bandwidth estimation method disclosed herein is provided. At step 200, various-sized packets are transmitted to a node on the Internet. Referring back to FIG. 1, a particularly-convenient node would be a domain name server (DNS) server 150 that is configured to be the DNS for the IP addresses for nodes on LAN 105. As discussed above, the ICMP PING facility is also particularly convenient for use in transmitting the desired packet sizes. By choosing DNS server 150 for the node to be PINGed, transmit time is minimized on Internet 115, thus increasing the accuracy of the upstream bandwidth estimation—an estimation that is grounded on the theory that the roundtrip time differences amongst the various-sized packets is caused by the limited upstream bandwidth provided by modem 110. It will be appreciated, however, that the present invention may be implemented with packets transmitted by other facilities such as HTTP to other nodes on the Internet.

Having transmitted the various-sized packets in step 200, the algorithm may proceed by comparing the roundtrip times for the packets to determine the upstream bandwidth for modem 110 in step 205. At step 215, non-VoIP data traffic may be limited based upon the estimated upstream bandwidth and a desired QoS. For example, if the desired QoS for VoIP conversations requires an upstream bandwidth of 100 kbps, then the non-VoIP data upstream data traffic must be limited to not exceed 28 kbps.

At step 220, the variability of the upstream bandwidth is examined. Should modem 110 be a DSL modem that does not vary its upstream bandwidth, the upstream bandwidth estimation may be considered complete. However, if modem 110 is expected to have a variable upstream bandwidth such as is the case for a cable modem, the upstream bandwidth estimation process should be periodically repeated according to the expected upstream bandwidth variability. For example, if the upstream bandwidth variability is expected to be large, the repetition rate should be higher than would be the case wherein the upstream bandwidth variability is smaller.

As discussed above, the estimation of the upstream bandwidth based upon the roundtrip time differences for different-sized packets may be performed in a number of fashions such as a lookup table. Alternatively, a mathematical expression may be used based upon a curve-fitting exercise. For example, consider the data in the following table:

| Up (kbps) | Down (kpbs) | 64-byte roundtrip delay (millisec) | 1500-byte roundtrip delay (millisec) | Ratio of the 1500-byte to the 64-byte delay |
|---|---|---|---|---|
| 64  | 512  | 40.2 | 266.0 | 6.62 |
| 128 | 512  | 32.3 | 158.3 | 4.90 |
| 256 | 1536 | 22.2 | 82.1  | 3.69 |
| 512 | 1536 | 20.1 | 56.1  | 2.79 |
| 256 | 2048 | 20.2 | 79.1  | 3.91 |
| 512 | 2048 | 19.5 | 52.9  | 2.71 |
| 512 | 4096 | 17.3 | 48.1  | 2.79 |
| 800 | 4096 | 17.0 | 46.9  | 2.77 |

A least-squares curve-fitting between the observed ratio of the 64-byte and 1500-byte delays and the actual upstream bandwidth provides the following expression:

$$\text{Estimated Upstream Bandwidth} = 8521.2(\text{ratio})^{-2.6111}$$

where the variable "ratio" represents the ratio of the 1500-byte and 64-byte packet delays.

Figure 3:
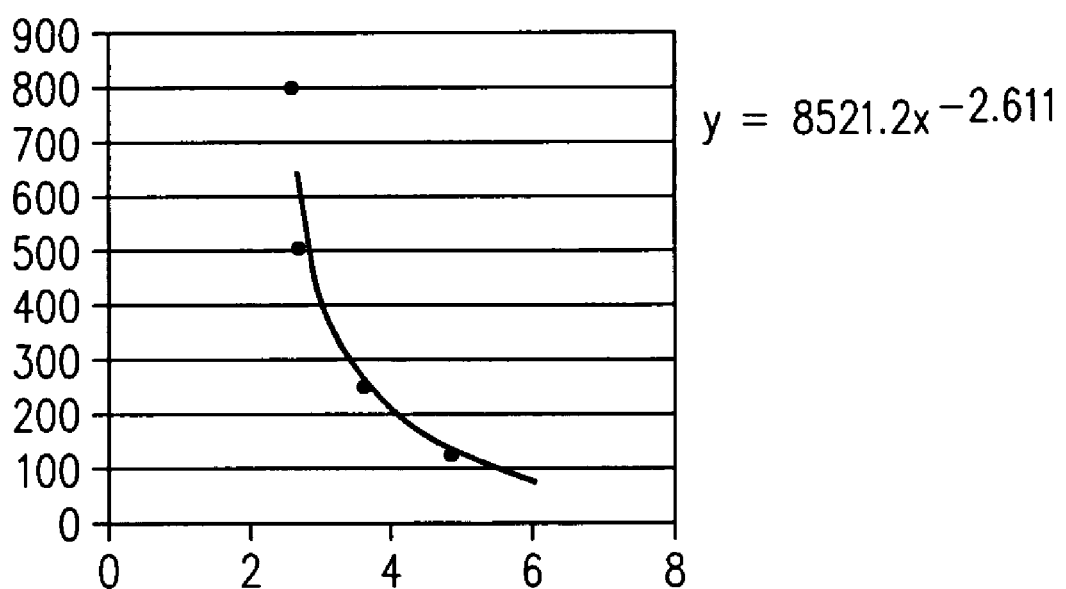
FIG. 3 illustrates the relationship between an estimated modem upstream bandwidth and the actual modem upstream bandwidth based upon a packet roundtrip ratio.

FIG. 3 illustrates the relationship between this expression and the actual upstream bandwidths as a function of the observed ratio. It may be observed that greater accuracy is provided at the lower values of upstream bandwidth such as 128 kbps. This is to be expected since the algorithm presumes that the roundtrip time differences are produced by an upstream bandwidth limitation. As the upstream bandwidth is increased, the effect of the upstream bandwidth being a limiting factor on the roundtrip time differences becomes less pronounced. Instead, other limitations in routing through the Internet become comparable such that relationship between the roundtrip time differences and the upstream bandwidth becomes more tenuous.

An integrated router 111 configured with the above-described mathematical expression would plug in the observed ratio to estimate the upstream bandwidth. It will be appreciated that a table lookup using the roundtrip times for a greater variety of various-sized packets would provide even greater accuracy.

Figure 4:
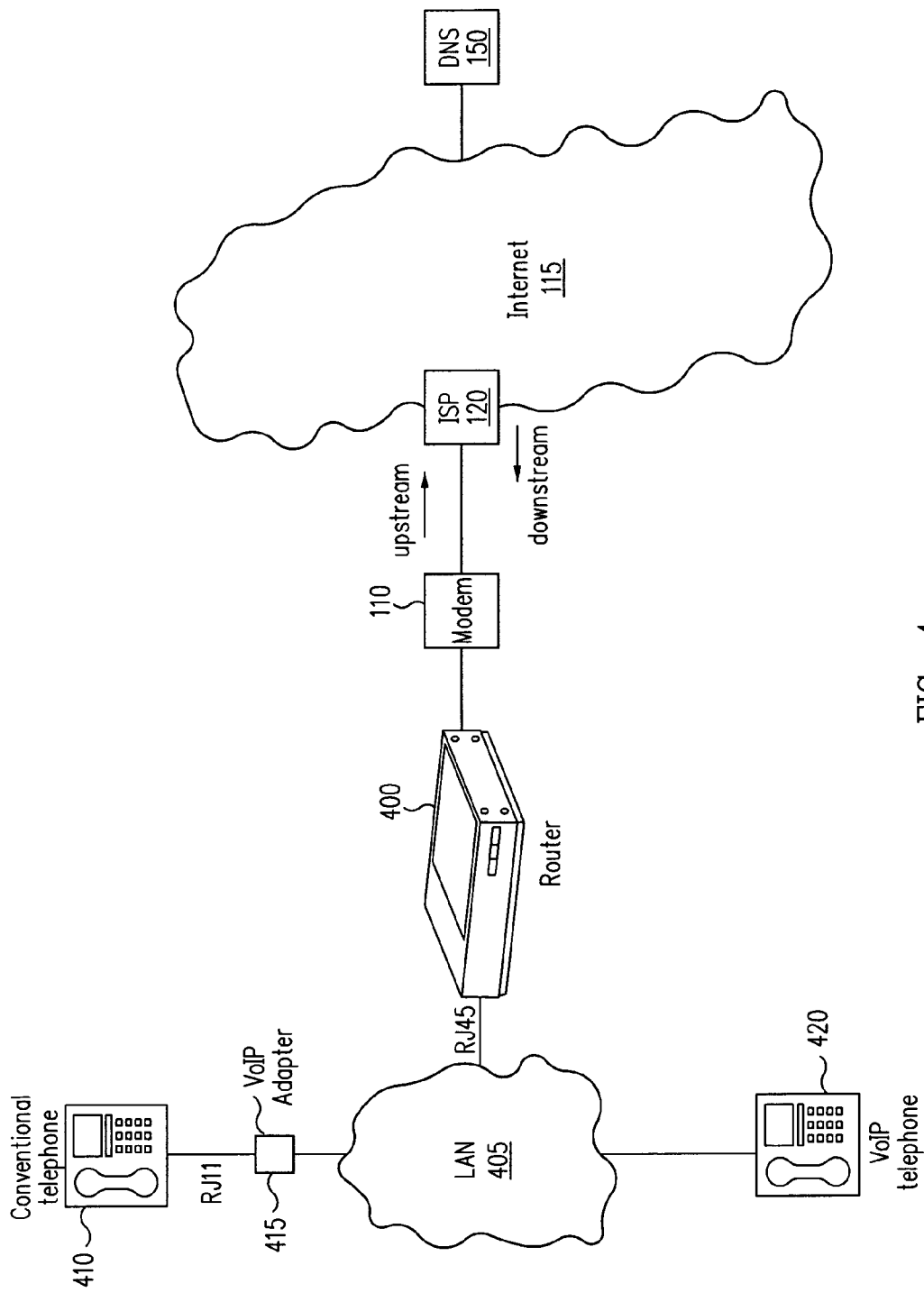
FIG. 4 is a block diagram illustrating a system including an VoIP-integrated router that is not VoIP-integrated, wherein the system estimates a modem upstream bandwidth in accordance with an embodiment of the invention.

Those of ordinary skill in the art will appreciate that many modifications may be made to the embodiments described herein. For example, rather than implement the bandwidth estimation algorithm directly through integrated router 111, an external device such as processor 140 may command router 111 to transmit the various-sized PING packets. Processor 140 would then process the resulting delay differences between the PING packets and configure integrated router 111 accordingly to limit the non-VoIP packets so as to preserve a QoS-satisfactory upstream bandwidth for the VoIP packets. Moreover, the upstream bandwidth technique may be implemented into networks that do not incorporate an integrated router. For example, a non-VoIP-enabled router 400 may be used to connect a LAN 405 to Internet 115 as shown in FIG. 4. A user on LAN 405 may place VoIP calls using a conventional analog telephone 410 through the use of a VoIP adapter 415 as known in the art. VoIP adapter 415 converts analog signals from conventional telephone 110 into VoIP packets that are then transmitted onto LAN 405. Router 400 then routes the VoIP packets to a VoIP ISP 120 through the upstream bandwidth of modem 110. Analogously as discussed with respect to FIG. 1, router 400 itself may initiate the transmission of various-sized PING messages to DNS server 150 or it may be commanded to do so by a processor coupled to LAN 405 so that the upstream bandwidth for modem 110 may be estimated. However, because router 400 is not a VoIP-integrated router, router 400 has no way of knowing whether or not the packets it routes are VoIP packets. Thus, router 400 cannot directly regulate the transmission of non-VoIP data packets to reserve a QoS-acceptable upstream bandwidth portion for VoIP packet traffic. To allow an indirect regulation, all other nodes on LAN 405 that provide non-VoIP data packets to router 400 may be configured to assign a certain maximum priority to their packet transmissions. The VoIP sources such as VoIP adapter 415 and VoIP telephone 420 may be configured to assign a priority to their packet transmissions that is higher than the maximum priority assigned to all other data packet transmissions. Router 400 would then examine the priority designation for all data packets it receives. Those packets with a priority designation higher than the maximum priority given to data packet transmissions would be assumed to be VoIP packets. Router 400 reserves a QoS-acceptable upstream transmission bandwidth for the assumed-to-be VoIP packets just as integrated router 111 would reserve such a bandwidth for its confirmed-VoIP packets.

Figure 5:
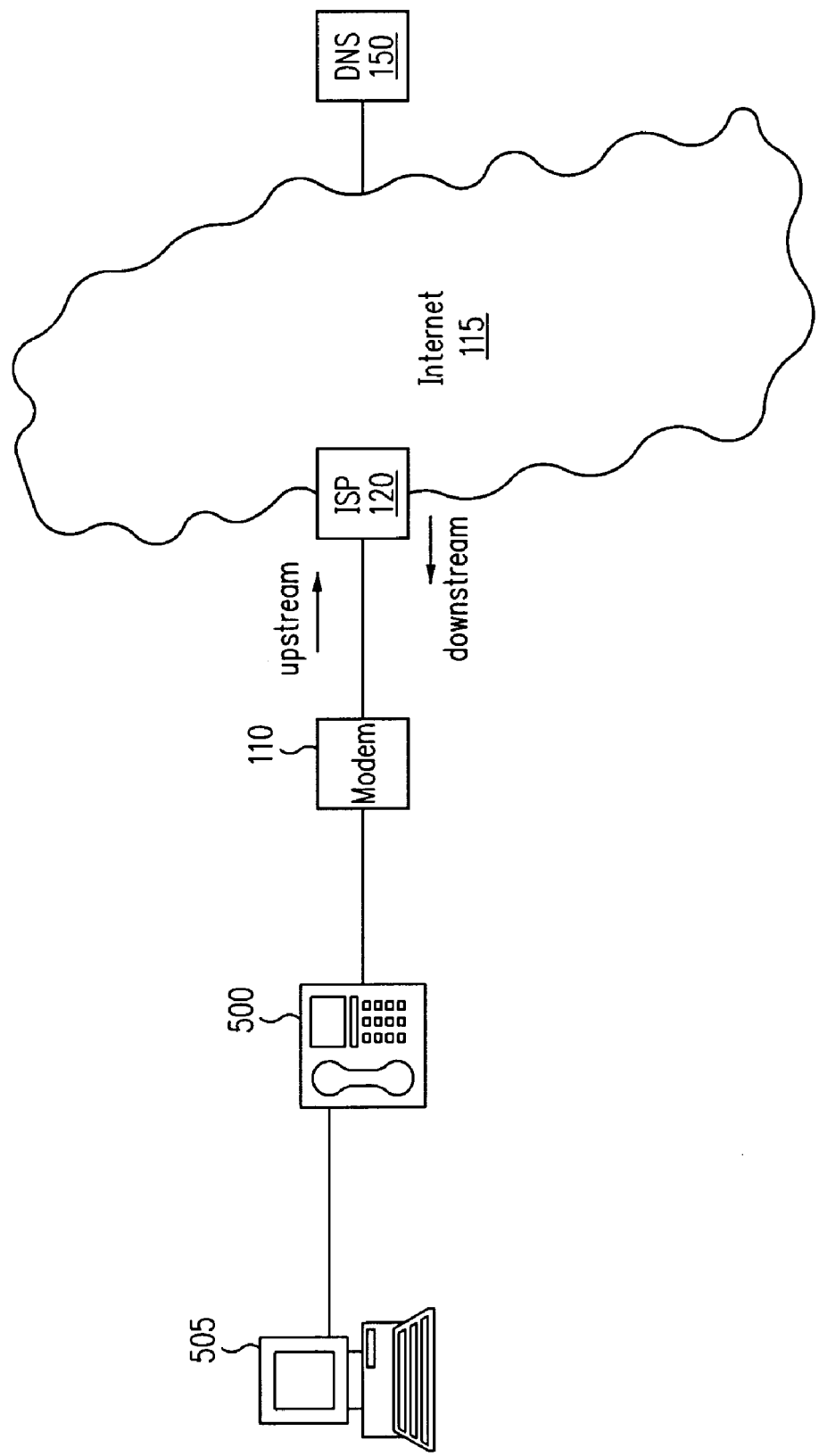
FIG. 5 is a block diagram illustrating a system including a VoIP telephone that is configured to estimate a modem upstream bandwidth in accordance with an embodiment of the invention.

In an alternate embodiment, the upstream bandwidth estimation technique described herein may be performed by a VoIP telephone 500 that directly couples to a modem such as seen in FIG. 5; VoIP telephone 500 may also route data traffic such as from processor 505 through the upstream bandwidth of modem 110. Thus, VoIP telephone 500 would be configured to transmit a series of variously-sized PING messages to DNS 150. The time-differences in roundtrip time for these PING messages would then be processed as discussed herein to calculate the modem upstream bandwidth. Based upon this estimation, VoIP telephone 500 would limit the transmission of non-VoIP data packets accordingly.

Figure 6:
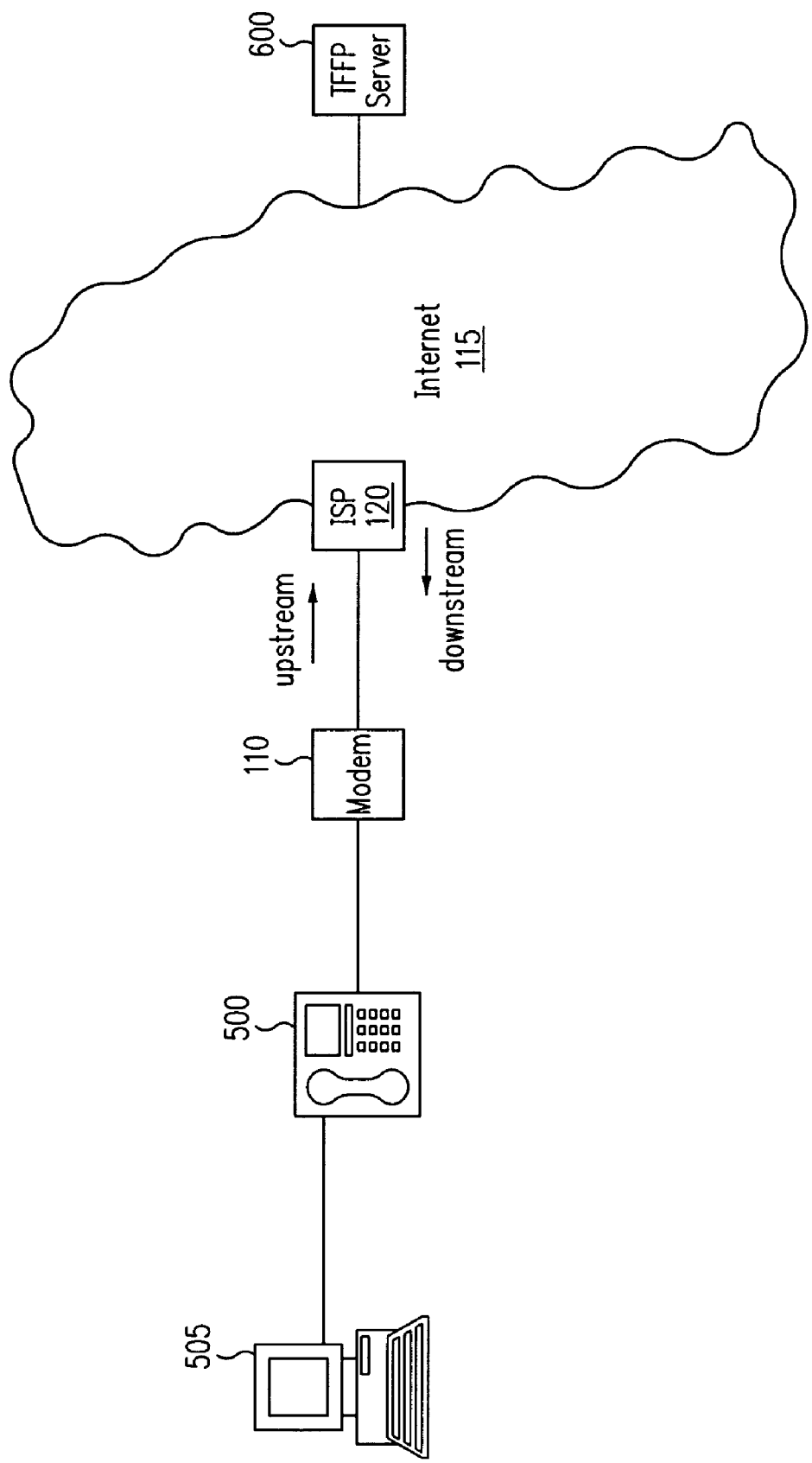
FIG. 6 is a block diagram illustrating a system including a VoIP telephone that is configured to estimate a modem upstream bandwidth in accordance with an embodiment of the invention.

In an alternative embodiment, upstream bandwidth may be estimated using a file transfer to a Trivial File Transfer Protocol (TFTP) server. For example, turning now to FIG. 6, a TFTP server 600 is shown coupled to the Internet 115. A VoIP telephone 500 couples directly through a modem 110 to an ISP 120 to access the Internet 115 as discussed with respect to FIG. 5. To determine the upstream bandwidth between modem 110 and ISP 120, VoIP telephone 500 initiates a file transfer of a suitably large file such as a 200K byte file to TFTP server 600. TFTP server 600 should have a large enough bandwidth that the delay in the transfer of the file will be largely attributable to upstream bandwidth restrictions. TFTP server 600 reports back to VoIP telephone 500 the completion time of the file transfer. Because VoIP telephone 500 knows the time when the file transfer was initiated, the file transfer time may be determined. By forming a ratio of the size of the file transferred to the file transfer time, VoIP telephone 500 may estimate the upstream bandwidth. This estimation may be based directly upon the ratio or based upon a table lookup using the transfer time and the file size. Having determined the upstream bandwidth, non-VoIP data traffic from sources such as PC 505 may be limited accordingly as previously described. Referring again to FIG. 4, it may be seen that an analogous procedure may be performed by integrated router 400 should DNS 150 be replaced by a TFTP server.

Figure 7:
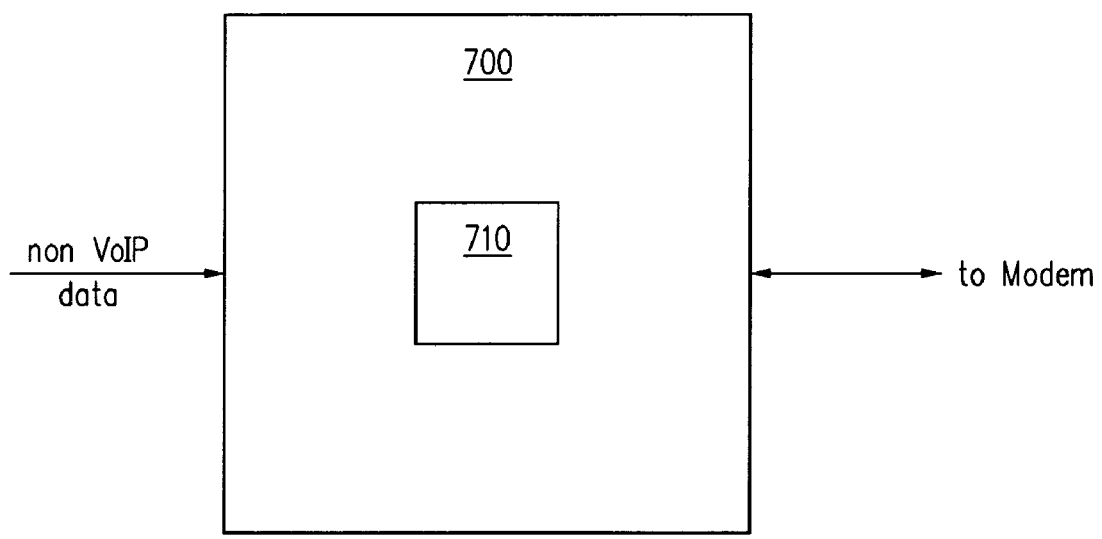
FIG. 7 is a block diagram of a network device configured to perform an upstream bandwidth estimation in accordance with an embodiment of the invention.

As described herein, the upstream bandwidth estimation procedure may be performed by a network device such as integrated router 400 or VoIP telephone 500. An exemplary network device 700 architecture is shown in FIG. 7. Network device 700 includes a state machine 710 configured to perform the upstream bandwidth procedure of the present invention. State machine 710 may be implemented with dedicated hardware or with a general purpose microprocessor. State machine 710 estimates the upstream bandwidth for a modem (not illustrated), which may be integrated within network device 700 or be external to it. Having estimated the upstream bandwidth, state machine 710 may limit the transmission of non-VoIp data traffic accordingly.

Although the invention has been described with respect to particular embodiments, this description is only an example of the invention's application and should not be taken as a limitation. Consequently, the scope of the invention is set forth in the following claims.

We claim:

1. A voice-over-IP (VoIP) integrated router operable to interface with analog telephones and digital devices, wherein the VoIP-integrated router is configured to perform a method of estimating an upstream bandwidth of a modem, comprising:

transmitting various-sized packets from the VoIP-integrated router through an upstream path for the modem to a node, the various sizes for the packets ranging from smaller packets to larger packets, the node being configured to re-transmit the various-sized packets through a downstream path for the modem to the VoIP-integrated router such that each packet makes a roundtrip through the modem;

determining the roundtrip times for the various-sized packets;

forming a ratio between a roundtrip time for the larger packets as compared to the round-trip time for the smaller packets; and estimating the upstream bandwidth of the modem using a power law function of the ratio.

2. The VoIP-integrated router of claim 1, wherein the VoIP-integrated router is configured to also limit non-VoIP data traffic on the upstream path for the modem based upon the up-stream bandwidth estimation.

3. The VoIP-integrated router of claim 2, wherein the limitation of the non-VoIP data traffic is also based upon a desired quality of service (QoS) for VoIP data traffic.

4. The VoIP-integrated router of claim 1, wherein the VoIP-integrated router is configured to estimate the upstream bandwidth of the modem using a table lockup.

5. The VoIP-integrated router of claim 1, wherein the VoIP-integrated router is configured to transmit the various-sized packets using Internet Control Message Protocol (ICMP) PING messages.

6. The VoIP-integrated router of claim 5, wherein the VoIP-integrated router is configured to transmit the PING messages to the node, the node being a domain name server.

7. The VoIP-integrated router of claim 6, wherein the VoIP-integrated router is configured to determine the upstream bandwidth by comparing the roundtrip time differences between a first PING message and a second PING message, wherein the first PING message is a 64-byte PING message and the second PING message has a payload greater than 64 bytes.

8. A router operable to examine the priority of data packets before routing the data packets, wherein a first set of data packets being routed are assigned a priority that is greater than a maximum priority given to a second set of data packets being routed, and wherein the router is configured to perform a method of estimating an upstream bandwidth of a modem, the method including the acts of:

transmitting various-sized packets from the router through an upstream path for the modem to a node, the various-sized packets ranging from smaller packets to larger packets, the node being configured to re-transmit the various-sized packets through a downstream path for the modem to the router such that each packet makes a roundtrip through the modem;

determining the roundtrip times for the various-sized packets;

forming a ratio between a roundtrip time for the larger packets as compared to the round-trip time for the smaller packets; and estimating the upstream bandwidth of the modem using a power law function of the ratio; and limiting a transmission of the second set of data packets through the upstream path for the modem based upon the upstream bandwidth estimation.

9. The router of claim 8, wherein the router is configured to estimate the upstream bandwidth of the modem using a table lookup.

10. The router of claim 8, wherein the router is configured to transmit the various-sized packets using Internet Control Message Protocol (ICMP) PING messages.

11. The router of claim 10, wherein the router is configured to transmit the PING messages to the node, the node being a domain name server.

12. The VoIP-integrated router of claim 11, wherein the VoIP-integrated router is configured to determine the upstream bandwidth by comparing the roundtrip time differences between a first PING message and a second PING message, wherein the first PING message is a 64-byte PING message and the second PING message has a payload greater than 64 bytes.

13. A voice-over-IP (VoIP) telephone, wherein the VoIP telephone is configured to perform a method of estimating an upstream bandwidth of a modem, comprising:

transmitting various-sized packets from the VoIP telephone through an upstream path for the modem to a node, the various-sized packets ranging from smaller packets to larger packets, the node being configured to re-transmit the various-sized packets through a downstream path for the modem to the VoIP telephone such that each packet makes a roundtrip through the modem;

determining the roundtrip times for the various-sized packets forming a ratio between a roundtrip time for the larger packets as compared to the round-trip time for the smaller packets; and estimating the upstream bandwidth of the modem using a power law function of the ratio.

14. The VoIP telephone of claim 13, wherein the VoIP telephone is configured to limit non-VoIP data traffic on the upstream path for the modem based upon the upstream bandwidth estimation.

15. The VoIP telephone of claim 13, wherein the limitation of any non-VoIP data traffic is also based upon a desired quality of service (QoS) for VoIP data traffic.

16. The VoIP telephone of claim 13, wherein the VoIP telephone is configured to estimate the upstream bandwidth of the modem using a table lookup.

\* \* \* \* \*